United States Patent [19]

Chapman

[11] Patent Number: 5,013,383
[45] Date of Patent: May 7, 1991

[54] EPOXY ADHESIVE FOR USE WITH THERMAL INK-JET PRINTERS

[75] Inventor: Charles B. Chapman, San Diego, Calif.

[73] Assignee: Hewlett-Packard Company, Palo Alto, Calif.

[21] Appl. No.: 378,345

[22] Filed: Jul. 11, 1989

[51] Int. Cl.$^5$ .................................................. C09J 5/02
[52] U.S. Cl. ................................ 156/307.3; 156/330; 346/140 A; 525/423; 528/123
[58] Field of Search ............................ 156/307.3, 330; 346/140 A; 525/423; 528/123

[56] References Cited

U.S. PATENT DOCUMENTS 2,970,077  1/1961  Grover ................................. 156/330
4,070,225  1/1978  Batforf ............................... 156/330

FOREIGN PATENT DOCUMENTS 44-9596   5/1969  Japan .................................. 525/423
57-102920 6/1982  Japan .................................. 525/423

Primary Examiner—John J. Gallagher

[57] ABSTRACT

An adhesive (14) is disclosed which is useful in bonding dissimilar adherends, such as silicon and plastic or stainless steel. The adhesive is particularly useful in bonding a printhead (12) and a pen body (10) for use in a thermal ink-jet printer, since it allows positioning of the printhead relative to the pen body prior to curing and, once cured, it seals against the aqueous-based ink contained within the pen body and provides structural integrity over the lifetime of the pen. The adhesive comprises a resin/hardener consisting essentially of a solid polyamide dispersed in an unmodified diglycidyl ether of bisphenol A, an aliphatic epoxy silane coupling agent, and, optionally, a reactive diluent and/or fumed silica, and is given by the formulation resin/hardener: 70 to 99 (% wt/wt)
  silane coupling: 0.5 to 3.5
  reactive diluent: 0 to 20
  fumed silica: 0 to 5.

9 Claims, 1 Drawing Sheet

5,013,383

EPOXY ADHESIVE FOR USE WITH THERMAL INK-JET PRINTERS

TECHNICAL FIELD

The present invention relates to bonding dissimilar adherends, and, more particularly, to bonding dissimilar adherends in thermal ink-jet printers employing aqueous inks.

BACKGROUND ART

In the production of thermal ink-jet pens for use in ink-jet printers, a printhead is bonded to the body of the pen. The printhead includes, inter alia, a plenum chamber for conducting ink to a plurality of firing chambers and a nozzle plate with nozzles, one for each firing chamber. Each firing chamber includes a resistor for propelling a droplet of ink through the nozzle toward an ink-receptive surface, such as paper.

The body of the pen serves as a reservoir for the ink and is fluidically connected to the plenum chamber in the printhead.

During assembly of the printhead on the pen body, an adhesive is used to bond the two together. The adhesive also "fixtures" the printhead to the pen body such that its location relative to the pen body is known and does not shift during processing or use. Further, the adhesive provides an additional function in serving as a fluid gasket against leakage of ink.

However, the printhead and the pen body have dissimilar coefficients of thermal expansion, since the surface of the printhead bonded to the pen body is silicon and the pen body is either a plastic such as a modified phenylene oxide or stainless steel. Thus, the adhesive must accommodate both the dissimilar expansions and contractions of the printhead and the pen body and be impermeable to attack by the ink, which is commonly a vehicle of water and at least one glycol and/or glycol ether plus dye, plus other substances, such as pH modifiers, biocides, etc. The present adhesive exhibits porosity (unpredictably), which leads to leakage and failure of the gasketing function.

DISCLOSURE OF INVENTION

In accordance with the invention, a method is provided for bonding an thermal ink-jet printheads to pen bodies using an epoxy adhesive. The method comprises applying an adhesive to at least one of the printhead and the pen body and curing the adhesive. The adhesive permits positioning of the printhead prior to curing, provides a liquid seal against ink fluidly communicating between the printhead and the interior of the pen body, and provides structural stability following the curing. The adhesive comprises a solid polyamide dispersed in an unmodified diglycidyl ether or bis-phenol A, an aliphatic epoxy silane coupling agent, and, optionally, a reactive diluent and/or fumed silica.

The adhesive formulation provides (a) a fixturing function to position the printhead relative to the pen body; (b) a fluid seal, or gasket, against leakage of ink; and (c) structural function for the life of the pen.

BRIEF DESCRIPTION OF THE DRAWING

The sole Figure is a side elevational view, depicting a pen body/ink reservoir, to which an ink-jet printhead is attached with an adhesive.

BEST MODES FOR CARRYING OUT THE INVENTION

Figure 1:
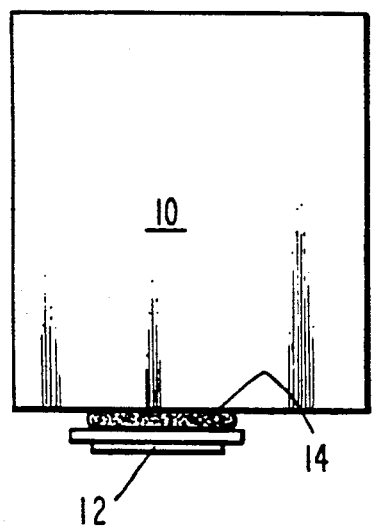

The Figure depicts a pen body 10, the interior of which serves as a reservoir for ink (not shown), and an ink-jet printhead 12, attached to the bottom of the pen body by means of an adhesive 14. The thickness of the adhesive 14 and the printhead 12 are exaggerated for purposes of illustration. As is well-known, the printhead 12 fluidically communicates with the interior of the pen body 10 to control the jetting of ink droplets onto a print medium through nozzles (not shown) in the bottom of the printhead.

The adhesive 14 of the invention comprises a resin/hardener consisting essentially of a solid polyamide dispersed in an unmodified diglycidyl ether of bis-phenol A, an aliphatic epoxy silane coupling agent, and, optionally, a reactive diluent and/or fumed silica. The adhesive preferably consists essentially of about 70 to 99 wt% of the resin/hardener, about 0.5 to 3.5 wt% of the silane coupling agent, 0 to about 20 wt% of the reactive diluent, and 0 to about 5 wt% of fumed silica. Most preferably, the adhesive consists essentially of about 80 to 90 wt% of the resin/hardener, about 1 to 3 wt% of the silane coupling agent, up to about 10 wt% of the reactive diluent, and about 0.2 to 5 wt% of the fumed silica.

The formulation is useful in bonding a printhead of a thermal ink jet pen to the body, and provides three functions: (a) fixturing, to position the printhead relative to the pen body; (b) sealing, or gasketing, to prevent leakage of ink from the pen body; and (c) structural, to provide sufficient bonding strength for the lifetime of the pen.

The resin may comprise any of the diglycidyl ethers of bis-phenol A, since these have an appropriate combination of shelf life and relatively low temperature curing cycles, which is important where the pen body is a plastic such as a modified phenylene oxide, which can only withstand temperatures up to about 135° C. without structural distortion. This resin is also useful at curing temperatures up to about 280° C. Such a temperature is useful where the pen body 10 is stainless steel.

The hardener may comprise a polyamide which is solid at room temperature, but which has a melting point of about 100° C. Such a melting point provides a good balance of shelf life and cure rate. A lower melting point adversely affects shelf life, while a higher melting point increases the curing temperature.

Resins of the type described above are widely available commercially, and contain a polyamide hardener which is solid at room temperature, with the reaction triggered by heating above the melting point of the hardener. An example of a suitable commercial preparation includes Ciba-Geigy HY-940, available from Ciba-Geigy (Hawthorne, N.Y.).

The silane coupling agent is one having a bifunctionality, preferably a silane at one end of the molecule having an affinity for the bonding surface of the printhead (which typically comprises silicon) and an epoxide at the other end for reacting into the adhesive matrix. An example of such a silane coupling agent includes glycidoxypropyltrimethoxy silane, commercially available as Dow-Corning Z6040 from Dow-Corning (Midland, Mich.).

While a reactive diluent is not per se required in the practice of the invention, it is useful in reducing the viscosity to mix in the ingredients, thereby protecting the resin/hardener from getting warm during mixing and consequently initiating reaction. Accordingly, the presence of the reactive diluent is preferred. The actual amount of reactive diluent would be easily determined by one skilled in this art from the teachings of this invention.

An example of a suitable reactive diluent useful in the practice of the invention includes a commercial preparation known as Epi-Rez 5048, which is an aliphatic glycidyl ether, available from Hi-Tek Polymers (Louisville, Ky.)

Fumed silica may optionally be added to control the flow, or rheology of the adhesive. It generally increases the thixotropy. Preferably, at least about 0.2% should be present for this benefit. The considerations that govern the selection of the appropriate fumed silica include its particle size, surface area and density. Fumed silica having the desired properties is commercially available from Cabot Corporation (Tuscola, Ill.) as CAB-O-SIL.

The advantages of the formulation of the invention include:

The ability to reliably bond dissimilar substrates (with different coefficients of thermal expansion) because the polyamide hardener lends some flexibility to the cured adhesive.

High latency with good reactivity at relatively low cure temperatures. This is achieved by using a polyamide hardener which is an unreactive solid at room temperature and a reactive liquid at about 100° C. This leads to both good shelf life and quick, low temperature cure cycles. Thus, engineering thermoplastics may be bonded without creep or stress relaxation occurring during cure.

The ability to reliably bond to silicon (and other substrates) which see extended service in an aqueous environment, such as inks used in ink-jet printers.

A reduced tendency to foam during cure because the equilibrium moisture content of the formulation is relatively low.

A thinner bondline (<0.001 inch), which is considerably lower than that of the previous adhesive, which had a minimum bond thickness of about 0.002 to 0.003 inch. A thinner bondline promotes transport of heat out of the printhead 12 to the pen body 10, where it is dissipated.

INDUSTRIAL APPLICABILITY

The adhesive of the invention is expected to find use in a variety of applications, including bonding thermal ink-jet printheads to pen bodies, where the coefficients of thermal expansion are dissimilar and where thin bondlines (<0.002 inch) are required.

An adhesive for use in bonding materials having dissimilar coefficients of thermal expansion has been described. It will be readily apparent to those skilled in this art that various changes and modifications of an obvious nature may be made without departing from the spirit and scope of the invention, and all such changes and modifications are considered to fall with the ambit of the invention, as defined by the appended claims.

What is claimed is:

1. A method for bonding a printhead of a thermal ink-jet printer to a portion of a pen body, said portion defined by an opening therein to an interior reservoir for storing an aqueous-based ink therein, to form a thermal ink-jet pen, comprising applying an adhesive to at least one of said printhead and said pen body, joining said printhead and said pen body, and curing said adhesive, said adhesive permitting positioning of said printhead prior to curing and providing both a liquid seal against said ink and structural stability following said curing, said adhesive comprising a resin/hardener consisting essentially of a solid polyamide dispersed in an unmodified diglycidyl ether of bis-phenol A, an aliphatic epoxy silane coupling agent, and, optionally, at least one of a reactive diluent and fumed silica.

2. The method of claim 1 wherein said adhesive consists essentially of about 70 to 99 wt% of said resin/hardener, about 0.5 to 3.5 wt% of said silane coupling agent, 0 to about 20 wt% of said reactive diluent, and 0 to about 5 wt% of said fumed silica.

3. The method of claim 2 wherein said adhesive consists essentially of about 80 to 90 wt% of said resin/hardener, about 1 to 3 wt% of said silane coupling agent, said reactive diluent present in an amount up to about 10 wt%, and about 0.2 to 5 wt% of said fumed silica.

4. The method of claim 3 wherein said silane coupling agent consists essentially of glycidoxypropyltrimethoxysilane.

5. The method of claim 3 wherein said reactive diluent consists essentially of aliphatic glycidyl ether.

6. The method of claim 1 wherein said printhead has a bonding surface which is bonded to said pen body, said bonding surface consisting essentially of silicon and said pen body consisting essentially of a modified phenylene oxide.

7. The method of claim 6 wherein said adhesive is cured at a temperature not exceeding about 135° C.

8. The method of claim 1 wherein said printhead has a bonding surface which is bonded to said pen body, said bonding surface consisting essentially of silicon and said pen body consisting essentially of stainless steel.

9. The method of claim 1 wherein said adhesive is cured at a temperature not exceeding about 280° C.

* * * * *